Patented Sept. 1, 1936

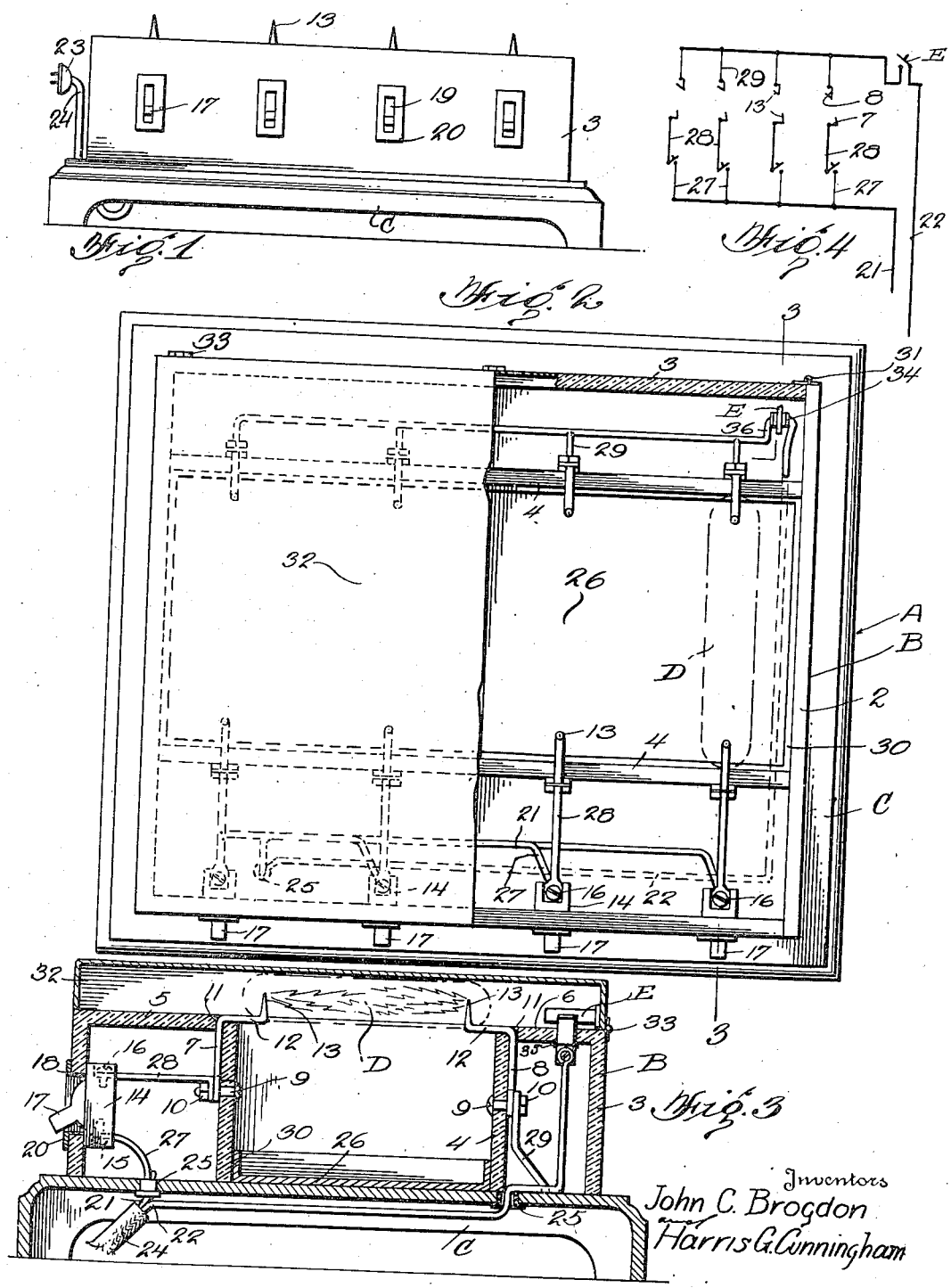

2,052,919

UNITED STATES PATENT OFFICE 2,052,919

ELECTRIC COOKING DEVICE

John Craver Brogdon and Harris Glenn Cunningham, Atlanta, Ga.

Application October 21, 1933, Serial No. 694,644

4 Claims. (Cl. 219—19)

Generically this invention relates to cooking devices, but it more especially comprehends the type of device where the article to be cooked is mounted in an electrical circuit and constitutes a resistance for causing a sufficient temperature to effect cooking thereof.

One of the principal objects of this invention is the provision of an electrical cooking device for meats, meat products and the like, wherein the article to be cooked is mounted between spaced electrodes of opposite polarity and adapted to constitute a resistance for producing sufficient temperature to effect cooking thereof.

Another important object of this invention is the provision of a cooking device of this character for meat articles such as weiners and the like, including a plurality of pairs of spaced electrodes mounted in an electrical circuit, and such respective articles to be cooked mounted between each pair, the material of each of the respective articles constituting a resistance adapted to cause sufficient temperature to properly cook said articles.

A further important object of this invention is the provision of an electrical cooking device comprising a plurality of pairs of electrodes connected in parallel or series, the articles to be treated being mounted on or between each of the respective pairs, the articles themselves constituting resistances in the electrical circuit causing sufficient temperature to effect cooking of said articles, and means for individually controlling the flow of current to each pair of electrodes.

Another important object of this invention is the provision of an electrical cooking device having a plurality of pairs of electrodes of suitable metal such as steel or the like, each pair adapted to be inserted into a weiner or the like at spaced points, each of the respective weiners constituting a resistance sufficient to effect cooking thereof, means in connection with each pair for controlling the flow of current thereto, a cover for said device, and means operable by said cover for automatically and simultaneously controlling the flow of current to all of said electrodes.

Another object of this invention is the provision of an electrical cooking device for weiners and the like comprising a plurality of fixed pairs of electrodes on each pair of which a weiner or article to be treated is adapted to be impaled by simply pressing down said article thereon and thereby eliminating the necessity of adjusting the electrodes for each cooking operation.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a side elevation of our improved electric cooking device.

Fig. 2 is a top plan view partly in section.

Fig. 3 is a section taken on the line 3—3 of Fig. 1.

Fig. 4 is a wiring diagram showing the method of carrying out the invention.

Briefly, the devices of this general character with which we are familiar have proven deficient in that it is necessary to in some manner adjust the electrodes to properly contact or support the article to be treated when it is operatively positioned or removed, and the employment of coils which soon burn out is likewise unsatisfactory, and it was to overcome such deficiencies and to provide a device requiring no coils, and wherein the electrodes are so constructed and positioned that each article can be expeditiously applied to, supported by, and removed from a respective pair of electrodes without requiring any adjustment of the same whatsoever, individual means for controlling the flow of current to each pair of electrodes, and means for automatically breaking the circuit to all the electrodes during the application and removal of the article or articles from the electrodes, that we designed the device forming the subject matter of this invention.

In the illustrated embodiment characterizing this invention there is shown a cooking device comprising a frame B and supporting base C. Base C is formed at each of its corners with a foot 1, and frame B suitably mounted thereon is formed with integral or suitably connected end walls 2 and side walls 3.

Suitably mounted on base C are the hook point or electrode supporting walls 4 similar to and extending in spaced parallelism with respect to walls 3, and suitably connecting the upper edges of said walls 3 and 4 are the horizontal table top or shelf members 5 and 6, the former, in the present instance, being wider than the latter for a purpose hereinafter more fully appearing.

Mounted on one of the walls 4 is a series of spaced hook members or electrodes 7 and on the opposite wall 4 a corresponding series of similar hook members or electrodes 8. Each of said members 7 and 8 is suitably insulated and adapted to be secured to the outer surface of a respective wall 4 by a bolt or binding post 9 suitably insulated in said wall and secured by nut 10. Each of the respective members 7 and 8 extends through a suitable opening 11 and is formed with a lateral extension 12 adapted to seat on the upper edge of wall 4 and terminating in a vertical electric spit point 13. Each food article to be cooked such as weiner D is impaled on the points 13 connecting or bridging a member 7 of one series with its opposite member 8 of the other series and closing the circuit through said pair of electrodes 7—8 as will hereinafter more fully appear. While we have preferably shown members 7 and 8 as extending through shelf members 5 and 6, it is to be understood that if desired said members may project through walls 4 below members 5 and 6 without departing from the scope or spirit of this invention.

Suitably mounted on the inner surface of the front side wall 3 opposite each member 7 is a switch mechanism 14 including binding posts 15 and 16 and a toggle lever 17 adapted to extend through opening 18 formed in said side and slot 19 of switch plate 20 suitably mounted on the outer surface of said side as clearly shown in Figs. 1 and 3 of the drawing.

A lead in wire or conductor 21 and a return wire or conductor 22 are connected to plug 23 and extend through an insulated covering 24 to a point within base C and through insulating plugs 25 inserted through the supporting face 26 thereof. Lead wire 21 is formed with a series of branch leads or conductors 27 with their free ends suitably connected to binding posts 15 of the respective switches 14 and a corresponding series of conductors 28 are adapted to connect and be secured by the respective binding posts 16 of switches 14 and posts 9 of electrodes 7. The return wire or conductor 22 is formed with a series of branch conductors 29 with their free ends secured respectively to binding posts 9 of electrodes 8 by nuts 10 as clearly shown in Fig. 3 of the drawing.

A pan 30 is adapted to seat on surface 26 of base C intermediate walls 4 to catch the drippings from food articles D during the cooking process and which may be provided with a rack, if desired, on which may be stacked the cooked articles, and in order to gain ready access to the interior of the device and expeditious removal of pan 30, one or both ends 2 may be hingedly mounted as at 31 or otherwise suitably removable.

For purposes of sanitation and not only to keep the articles warm after they have been cooked, but to prevent any accidental contact of the hands of the operator with a weiner or other food article while the same is acting as a resistance to the flow of the electric current therethrough, a cover 32 preferably constructed from a transparent material is mounted on frame B hingedly secured as at 33. A suitable switch mechanism E is mounted in trunk line 22, in the present instance of the knife blade type, with socket member 34 connected on opposite sides to wire 22 and suitably mounted on insulating block 35 suitably secured to shelf 6. The blade portion 36 of said switch is suitably mounted on cover 32, so that the lifting or opening of cover 32 automatically breaks the circuit to all of the electrodes, whereby contact with the device and handling of the food articles may be safely and expeditiously effected.

The wiring diagram, Fig. 4, explains the circuit arrangement of the device. When plug 23 is plugged into a floor, wall, or like socket connected to a source of electrical power (not shown), the voltage supply from said source of electrical energy enters over conductor 21, conductor 27, switch 14, conductor 28, electrode 7, food article D, or respective food articles, electrode 8, conductor 29, conductor 22, switch E, and conductor 22, back to plug 23, and to source of supply.

While the operation would seem to be clear from the above description, it might be well to further state that when plug 23 has been operatively positioned, a food article D impaled on points 13 of a pair of electrodes 7—8 and cover 32 closed, a circuit, as above traced, will be closed through the device, the article D not only constituting a circuit closing means but acts as a resistance to the electric current flow thereby producing sufficient heat to effect cooking of the article as hereinbefore described. The flow of current may be cut off to any pair or pairs of electrodes 7—8 by a respective switch 14. The circuits to all of said pairs are automatically opened when cover 32 is in raised or open position, and one or all of said circuits may be closed when said cover is in closed position, depending upon the setting of the respective switches 14 and the number of food articles bridging the respective pairs of electrodes 7—8.

From the above it is apparent that we have designed an electric cooking device, wherein each food article constitutes a circuit closer and acts as a resistance to the flow of the electric current to effect cooking thereof, one simple in construction, manufacturable and operable at a minimum of cost, safe in operation, and efficient for the purposes intended.

Although in practice we have found that the form of our invention illustrated in the accompanying drawing and referred to in the above description as the preferred embodiment is the most efficient and practical, yet realizing the conditions concurrent with the adoption of our invention will necessarily vary, we desire to emphasize that various minor changes in details of construction, proportion and arrangement of parts, may be resorted to within the scope of the appended claims without departing from or sacrificing any of the principles of this invention.

Having thus described our invention, what we desire protected by Letters Patent is as set forth in the following claims:

1. An electrical cooking device in the nature of a grill wherein a food product such as a weiner is adapted to be cooked by having an electrical current pass therethrough including a frame comprising side and end walls, a pair of parallel wall members spaced inwardly from said first mentioned sides, a series of fixed spaced pointed electrodes mounted on said last mentioned wall members, a switch interposed in the circuit of each pair mounted in one of said first mentioned side walls, a transparent cover for said device including switch means associated therewith, whereby the circuits of all of said pairs will be simultaneously opened when the cover is in raised position and simultaneously closed when the cover is in closed position.

2. An electrical cooking device in the nature of a grill wherein a food product such as a weiner is adapted to be cooked by having an electrical current pass therethrough including a frame comprising side and end walls, a parallel member spaced inwardly from each of said sides, a fixed vertically pointed electrode mounted on each of said parallel members, a switch interposed in the circuit of said electrodes and mounted in one of said sides for opening and closing said circuit, a transparent cover for said device including a switch means associated therewith, whereby said circuit is opened when the cover is raised and closed when the cover is closed.

3. An electrical grill-like cooking device wherein a food product such as a weiner is adapted to be cooked by having an electrical current pass therethrough comprising a frame including side walls and parallel members spaced inwardly from the respective sides forming chambers, a series of fixed electrodes mounted in each of the respective chambers extending upwardly and inwardly in meeting direction terminating in vertical points, the opposed electrodes of each series constituting a pair, switch means interposed in the circuit of each pair and mounted in one of said side walls, and a transparent cover including a switch for simultaneously opening all of said circuits when the cover is in raised position and closing same when in lowered position.

4. An electric grill-like cooking device wherein a food product such as a weiner is adapted to be cooked by an electrical current passing therethrough, comprising a frame including side walls and parallel members spaced inwardly from the respective sides forming chambers and a central compartment intermediate the chambers, a series of fixed electrode members mounted in each of the chambers and extending upwardly and inwardly, supported on the upper edges of said parallel members, extending in meeting direction and terminating in vertical points above said central compartment so that a weiner may be adapted to be impaled thereon in bridging relation with respect to each pair, removable means positioned beneath said weiners adapted to catch the drippings therefrom, a transparent cover including a switch for simultaneously opening the circuits of each pair when the cover is in raised position and closing the same when in lowered position, and a switch means interposed in the circuit of each pair mounted in one of said side walls to selectively open the respective circuits irrespective of the closed position of the first mentioned switch.

JOHN CRAVER BROGDON.
HARRIS GLENN CUNNINGHAM.